US011323572B2

(12) United States Patent
Ly

(10) Patent No.: US 11,323,572 B2
(45) Date of Patent: May 3, 2022

(54) CALL ROUTING TO CONVERT SYNCHRONOUS LANDLINE VOICE COMMUNICATIONS INTO ASYNCHRONOUS BIDIRECTIONAL TEXT MESSAGING

(71) Applicant: 3Good LLC, Danville, CA (US)

(72) Inventor: Binh Ly, Danville, CA (US)

(73) Assignee: 3Good LLC, Danville, CA (US)

( * ) Notice: Subject to any disclaimer, the term of this patent is extended or adjusted under 35 U.S.C. 154(b) by 0 days.

(21) Appl. No.: 16/993,499

(22) Filed: Aug. 14, 2020

(65) Prior Publication Data

US 2021/0051232 A1    Feb. 18, 2021

Related U.S. Application Data

(60) Provisional application No. 62/887,020, filed on Aug. 15, 2019.

(51) Int. Cl.
*H04M 3/54* (2006.01)
*H04W 4/16* (2009.01)

(52) U.S. Cl.
CPC ............... *H04M 3/54* (2013.01); *H04W 4/16* (2013.01)

(58) Field of Classification Search
USPC ........................................................ 455/417
See application file for complete search history.

(56) References Cited

U.S. PATENT DOCUMENTS

| 10,917,518 B2 * | 2/2021 | Salter ...................... G06F 40/30 |
| 2007/0072602 A1 * | 3/2007 | Iyer ...................... H04M 1/642 |
| | | 455/426.1 |

* cited by examiner

*Primary Examiner* — Amal S Zenati
(74) *Attorney, Agent, or Firm* — Dergosits & Noah LLP; Todd A. Noah

(57) ABSTRACT

A Landline Texting Engine associates a proxy telephone number with a select landline telephone number for forwarding incoming calls intended for the select landline telephone number to the proxy telephone number. The Landline Texting Engine intercepts a forwarded incoming call. The Landline Texting Engine detects incoming voice data in the forwarded incoming call. In response to detecting the incoming voice data, the Landline Texting Engine sends text data on behalf of the select landline telephone number from the proxy telephone number, the text data identified as being sent from the select landline telephone number.

15 Claims, 7 Drawing Sheets

# CALL ROUTING TO CONVERT SYNCHRONOUS LANDLINE VOICE COMMUNICATIONS INTO ASYNCHRONOUS BIDIRECTIONAL TEXT MESSAGING

CROSS-REFERENCE TO RELATED APPLICATIONS

This application claims the benefit of U.S. Provisional Patent Application No. 62/887,020, filed Aug. 15, 2019, which is hereby incorporated by reference in its entirety.

TECHNICAL FIELD

The present disclosure relates generally to telecommunications and, specifically, to text messaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Text messaging refers to the exchange of user composed messages transmitted across cellular networks. Historically texting has been available and enabled on mobile phone devices and between mobile phone devices. Phone carriers have also enabled a mechanism where a mobile phone can be reached via text message by sending an email to the carrier with the phone number as the recipient.

Typically, when a person sends a text message to a phone number, they assume that the recipient is also using a mobile phone and has the ability to send a text message back. Further, when a person calls a phone number for a business, they expect that someone will pick up the telephone and answer the call. In the event that the business is unable to answer the call the call can be routed to voicemail or the caller can be placed on hold.

BRIEF SUMMARY

Conventional systems lack a functionality by which an intended recipient of a call can transition voice communication on a landline phone number into a text messaging conversation with that same landline phone number. The utilization of the landline number is key, especially for businesses and professionals, because it is the phone number that the caller is expecting to interact with. The consistent use of the business's landline phone number establishes trust between the caller and the business. Because the text message is originating from the business's landline phone number, the caller can trust the content and nature of the text communication. This trust enables the business to communicate and transmit richer, more interactive communication.

The disclosed embodiments generally include a method, computer program product and system for a Landline Texting Engine. The Landline Texting Engine Landline Texting Engine associates a proxy telephone number with a select landline telephone number for forwarding incoming calls intended for the select landline telephone number to the proxy telephone number. The Landline Texting Engine intercepts a forwarded incoming call. The Landline Texting Engine detects incoming voice data in the forwarded incoming call. In response to detecting the incoming voice data, the Landline Texting Engine sends text data on behalf of the select landline telephone number from the proxy telephone number, the text data identified as being sent from the select landline telephone number.

According to various embodiments, the Landline Texting Engine detects the incoming voice data as being sent from a mobile phone number. The Landline Texting Engine sends outgoing voice data (such as a pre-recorded audio message) on behalf of the select landline telephone number to the mobile phone number. The Landline Texting Engine then sends text data (e.g. SMS message(s)) to the mobile telephone number on behalf of the select landline telephone number.

According to various embodiments, the Landline Texting Engine further provides for display of a graphical user interface for display of chat messaging between a calling mobile device and the intended recipient of the mobile device's call. Messages sent from the intended recipient are displayed as being sent from the select landline telephone number.

According to various embodiments, a machine learning network may be trained based on training data that includes, in part, data from incoming voice data, incoming text data and outgoing text data. Features and classifications for one or more machine learning models may be defined according to the training for predicting the amount of incoming calls, the subject matter of incoming text messages and the most appropriate subject matter of outgoing text messages and recommended actions to be performed by an intended recipient of an initial incoming call.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Any of the embodiments described herein may be used alone or together with one another in any combination. The one or more implementations encompassed within this specification may also include embodiments that are only partially mentioned or alluded to or are not mentioned or alluded to at all in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Some embodiments described herein may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments may also be practiced in distributed computing environments where tasks are performed by remote processing devices that are linked through a communications network. In a distributed computing environment, program modules may be located in both local and remote computer storage media including memory storage devices.

Figure 1A:
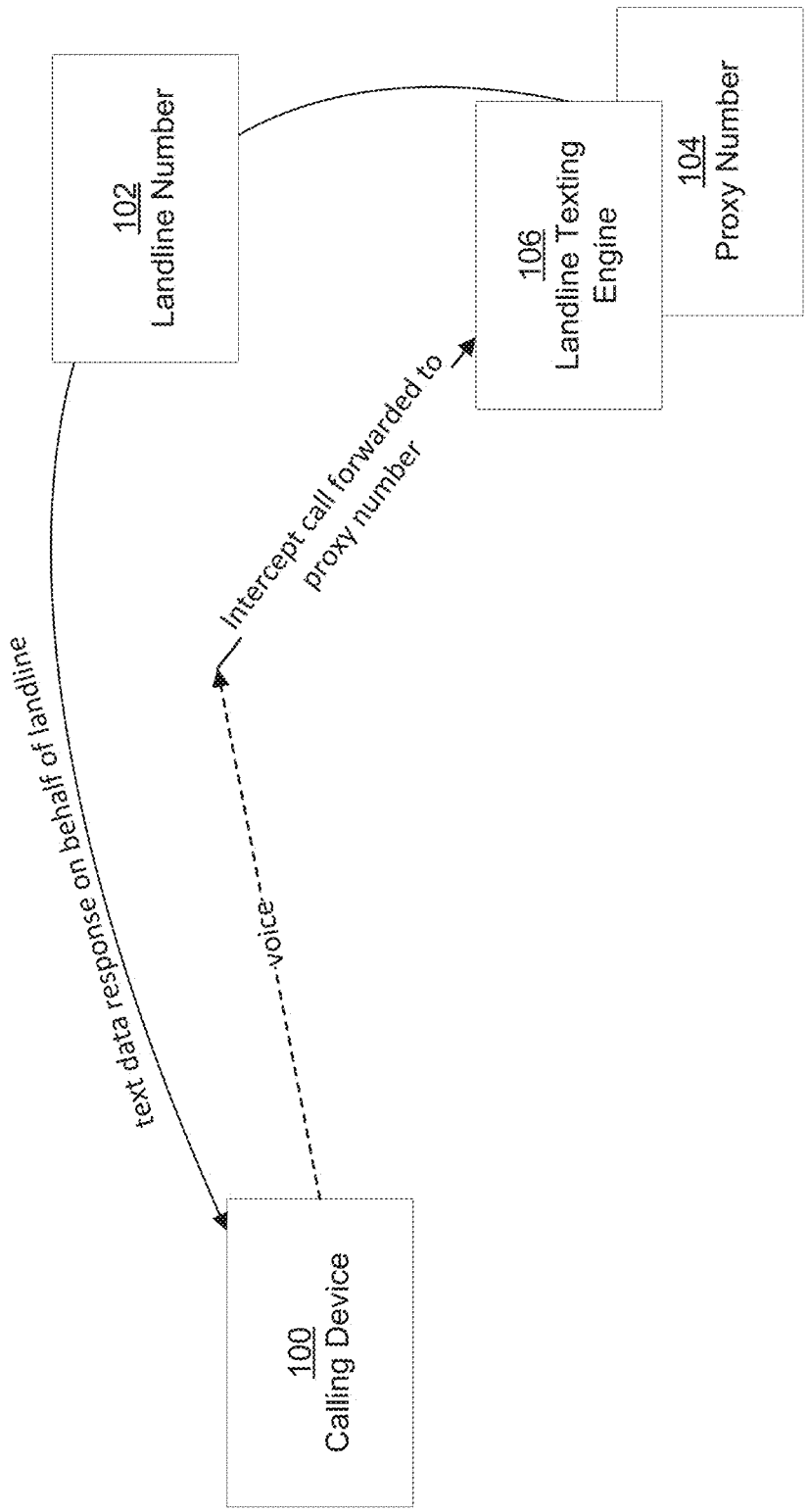
FIG. 1A is a diagram illustrating an exemplary environment in which some embodiments may operate.

According to the high-level diagram as shown in FIG. 1A, a calling device 100, such as a mobile device, may send a call based on voice data to a landline telephone number 102. A proxy telephone number 104 that corresponds with the Landline Texting Engine 106 may be associated with the landline telephone number 102. The proxy telephone number 104 acts as an interface into the Landline Texting Engine 106. An incoming call to the landline telephone number will be forwarded to the proxy telephone number 104. The Landline Texting Engine 106 intercepts the forwarded call. The Landline Texting Engine 106 intercepts the forwarded incoming call based on detecting the incoming call due to the association between the landline telephone number 102 and the proxy telephone number 104 to which the incoming call has been forwarded.

The Landline Texting Engine 106 receives the intercepted call and may send responses back to the calling device 100 on behalf of the landline telephone number 102. For example, the Landline Texting Engine 106 sends one or more text messages to the calling device 100 during a chat message session. However, the text messages received at the calling device 100 from the Landline Texting Engine 106 identify the source of the text messages as the landline telephone number 102.

According to various embodiments, the Landline Texting Engine 106 may generate a link (i.e. Uniform Resource Locator) to a messaging graphical user interface and insert the link into a text message to be sent from to the calling device. Upon selection of the link at the calling device, the messaging graphical user interface may be displayed at the calling device and a chat session my be initiated by the Landline Texting Engine 106 between the calling device and the Landline Texting Engine 106. An end user thereby experiences having chat sessions that includes multiple incoming and outgoing text messages with the landline telephone number 102 that was the intended recipient of the initial call.

Figure 1B:
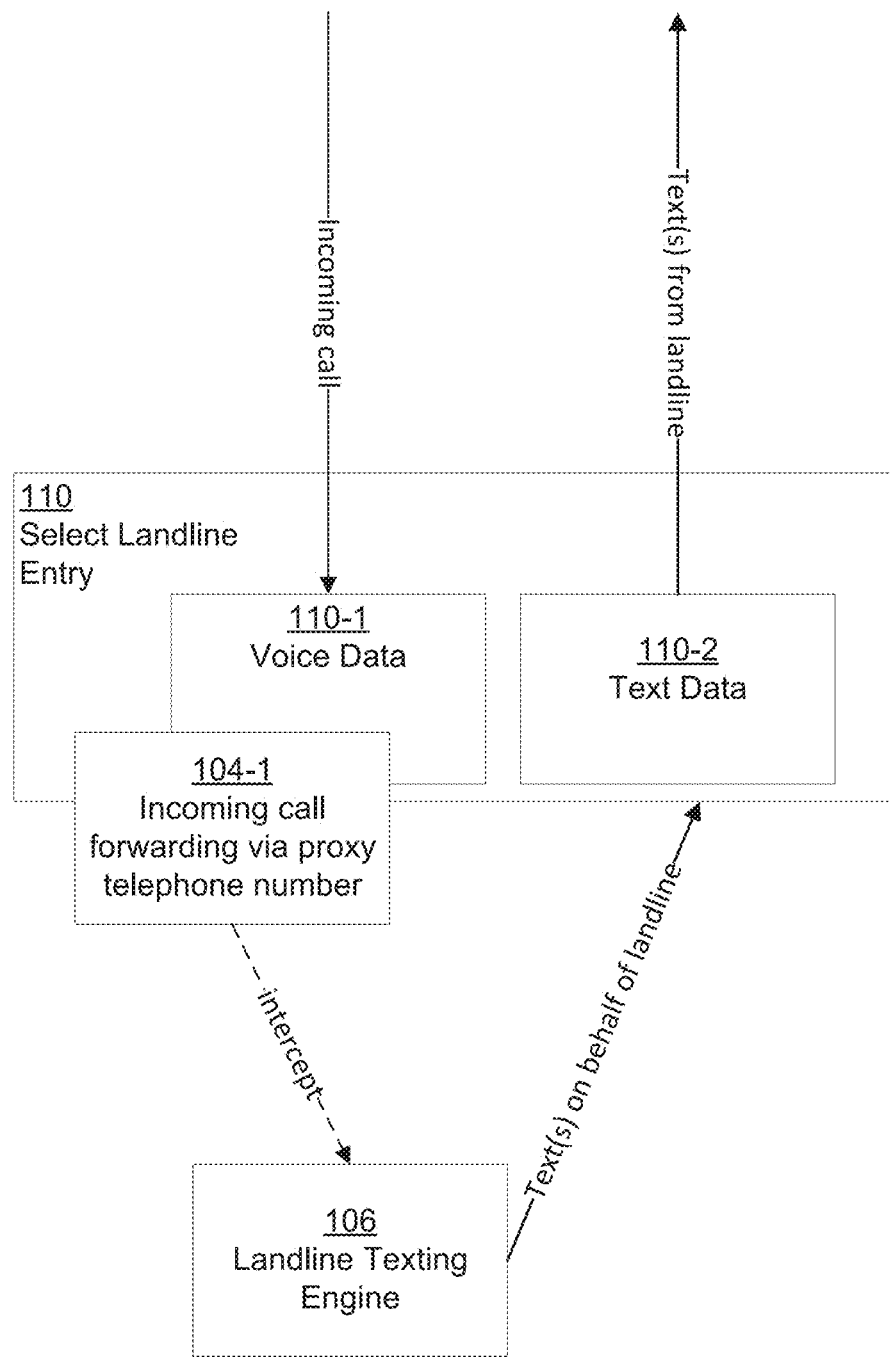
FIG. 1B is a diagram illustrating an exemplary environment in which some embodiments may operate.

As shown in FIG. 1B, a landline telephone number 102 may have a corresponding entry 110 in a global telephone number registry (or routing table). For example, the landline telephone number entry 110 may be an entry in the eSPID. The eSPID is a construct used by telephone companies that include respective entries, whereby each entry indicates the capabilities of a phoneline. For example, the eSPID indicates whether a phone line has voice and/or data capabilities. As such, entry 110 may have fields 110-1, 110-2 that indicate routing behaviors related to types of telecommunications being sent to and from the landline telephone number 102. A voice data field 110-1 may identify the landline telephone number itself for routing incoming voice data to the landline telephone number and outgoing voice data from the landline telephone number.

Voice data that is incoming will be routed according to the voice data entry 110-1. Call forwarding techniques are herein leveraged such that incoming voice calls are diverted away from being received at the landline telephone number 102. The Landline Texting Engine 106 intercepts incoming calls forwarded to the proxy telephone number 104-1. However, since the landline telephone number, by definition, is not capable of sending and receiving text data, a text data field 110-2 may be null. The Landline Texting Engine 106 can leverage the existing text data field 110-2 by sending text data down the phone line associated with the entry 110 for the landline telephone number 102. Text messages sent by Landline Texting Engine 106 may therefore include an identification of the landline telephone number 102 as the source of the text messages as a result of the text messages having been routed according to the landline telephone number's text data entry 110-2.

According to various embodiments, the Landline Texting Engine may continuously collect and store incoming and outgoing data between one or more telephone numbers (i.e. multiple different calling devices) and the proxy telephone number 104 responding on behalf of the landline telephone number 102. The Landline Texting Engine may collect incoming and outgoing data in order to build training data to train one or more machine learning network models for an entity, such as a business, associated with the landline telephone number 102. The Landline Texting Engine may include implementation of a machine learning module associated with the landline telephone number 102 that generates prediction output based on one or more characteristics related to an incoming call(s).

Figure 2:
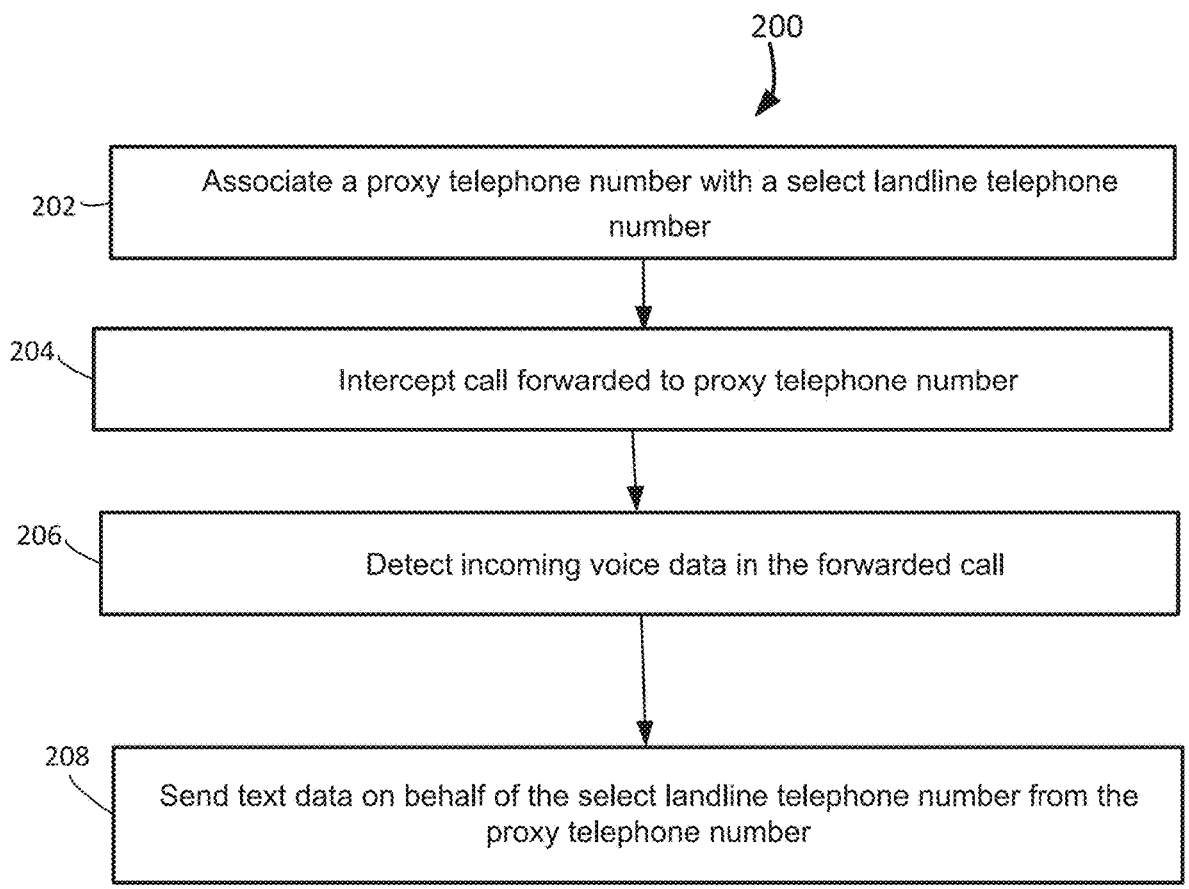
FIG. 2 is an operational flow diagram according to embodiments described herein.

As shown in the flowchart 200 of FIG. 2, at step 202, the Landline Texting Engine associates a proxy telephone number with a select landline telephone number. For example, an entity, such as a restaurant, activates the Landline Texting Engine and the Landline Texting Engine issues a proxy telephone number for the entity. Incoming calls originally sent to the landline telephone number may now be forwarded to the proxy telephone number. Incoming calls forwarded to the proxy telephone number are intercepted by the Landline Texting Engine.

At step 204, the Landline Texting Engine intercepts the forwarded incoming call and, at step 206, the Landline Texting Engine detects, in the intercepted forwarded call, incoming voice data sent to the select landline telephone number. The Landline Texting Engine detects the type of call carrier from which the incoming voice data (or incoming call) originated. Upon determining the incoming voice data originated from a mobile device, the Landline Texting Engine sends a response to the mobile device. The response from the Landline Texting Engine may include voice data for a pre-recorded message that affords an end-user of the mobile device a window of time to opt-out of initiating a text message conversation. If the end-user does not opt-out, at step 208, the Landline Texting Engine sends text data on behalf of the select landline telephone number. The Landline Texting Engine may further disconnect from the incoming call and separately initiate a text message conversation. To disconnect the call, the Landline Texting Engine terminates a connection between the proxy telephone number and the source device of the incoming call.

According to various embodiments, the Landline Texting Engine may determine the incoming voice data originated from a landline phone number, such as a residential telephone device. The Landline Texting Engine routes the call to a pre-recorded message that prompts the end-user of the calling device to leave a voicemail message. The Landline Texting Engine may further send a notification to a graphical user interface displayed on a separate computer device that is associated with the intended recipient landline telephone number. The notification may prompt an end-user of the recipient landline telephone number to accept the incoming voice call in order to answer the calling device's call.

Figure 3:
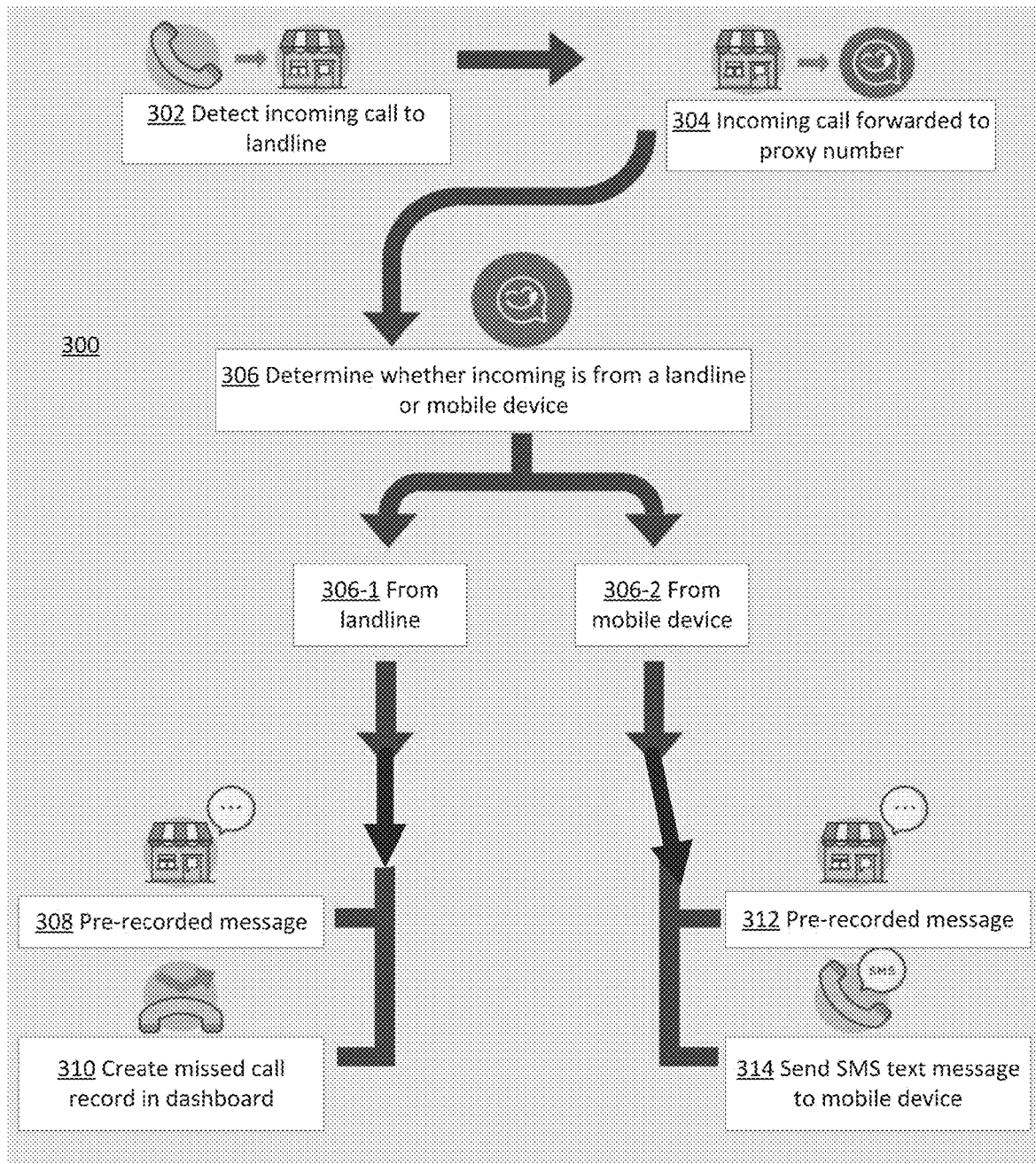
FIG. 3 is an operational flow diagram according to embodiments described herein.

As shown in the flowchart 300 of FIG. 3, the Landline Texting Engine detects an incoming call to a select landline telephone number (Step 302) and intercepts the incoming call forward to the proxy number (Step 304) that was issued to a business by the Landline Texting Engine. The Landline Texting Engine analyzes the incoming call to determine whether a source of the incoming call is a mobile device or a landline telephone number (Step 306). For example, the Landline Texting Engine performs a CNAM lookup in order to determine a telephone carrier associated with the incoming call and a type of phone line (i.e. mobile, landline, VoIP) that is associated with the incoming call.

Upon determining the incoming call is sent from a landline telephone number (Step 306-1), the Landline Texting Engine triggers display of a message on a graphical user interface associated with the business' select landline phone number (Step 308). For example, the Landline Texting Engine may generate a dashboard GUI for display on a computer device associated with the business. A notification of the incoming call may be displayed on the dashboard GUI. The Landline Texting Engine may further provide voice data to the calling landline telephone number that includes an instruction(s) to record a voicemail and the Landline Texting Engine may generate a notification representing the voicemail for display on the dashboard GUI as well.

Upon determining the incoming call is sent from a mobile device (Step 306-2), the Landline Texting Engine sends outgoing voice data on behalf of the select landline telephone number to the calling mobile device (Step 312). For example, the Landline Texting Engine sends voice data that includes a pre-recorded message which prompts the end-user at the calling mobile device to indicate whether or not the end-user would like to proceed to have a chat messaging session with the business. The Landline Texting Engine may receive an opt-out selection from the calling mobile device. Based on the opt-out selection, the Landline Texting Engine disconnects from the connection between the calling mobile device and the proxy telephone number in order to end the call. However, if the opt-out selection is not received, the Landline Texting Engine sends text data, via the text capabilities of the phone line of the select landline telephone number, to the mobile telephone number on behalf of the business' select landline telephone number (Step 314).

Figure 4:
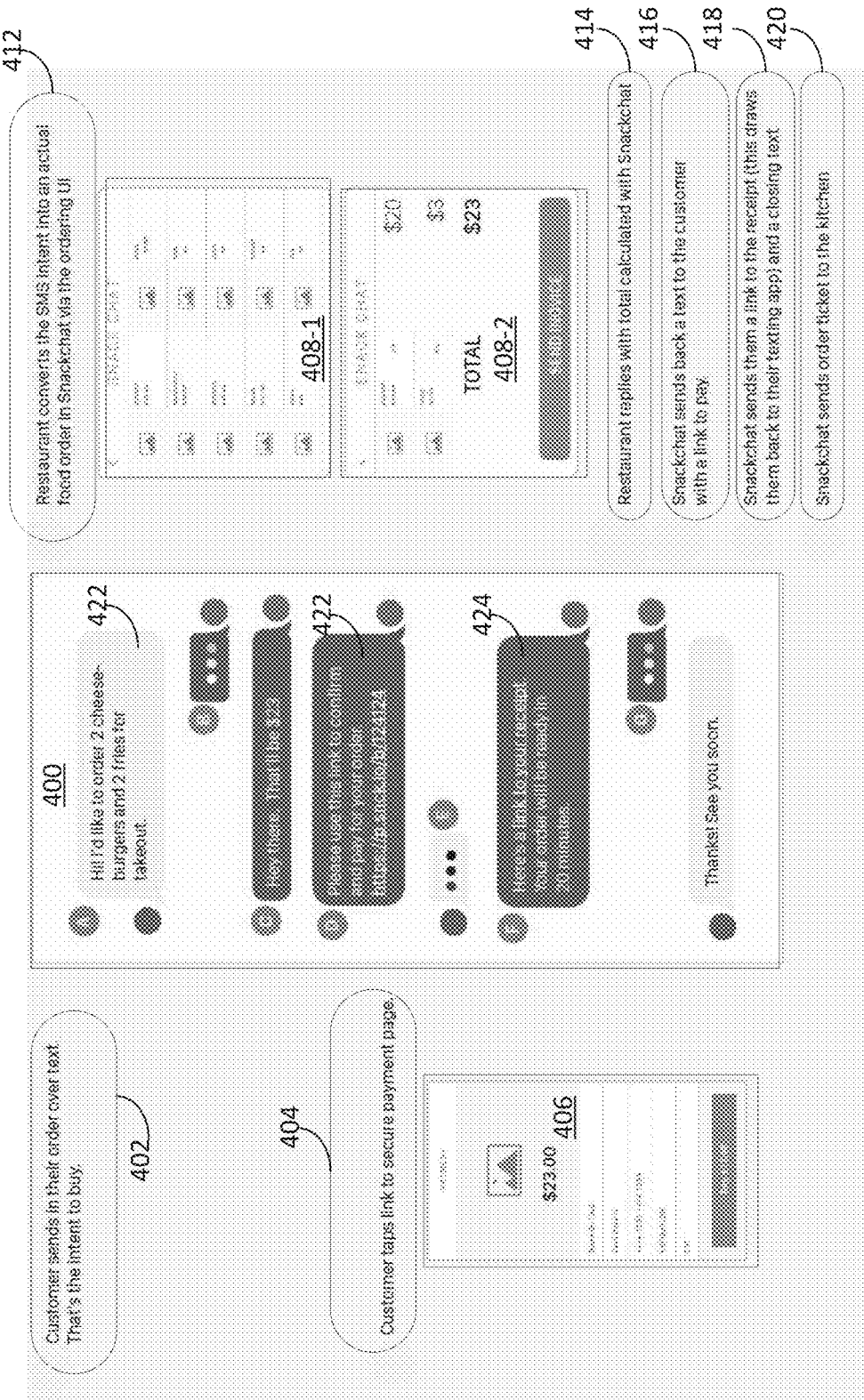
FIG. 4 is a diagram illustrating an exemplary environment in which some embodiments may operate.

As shown in FIG. 4, the Landline Texting Engine may generate a chat graphical user interfaces (GUI) 400 for display at a computer device associated with a select landline telephone number that is an intended recipient of a forwarded call intercepted by the Landline Texting Engine. The chat GUI 400 may further be displayed at a mobile device initiating the call. The Landline Texting Engine provides one or more functionalities for sending and receiving text message between the mobile device and a proxy telephone number sending text messages on behalf of the select landline telephone number.

For example, the select landline telephone number may be associated with a restaurant and an end-user of the mobile device may call the restaurant to place an order for a meal. The proxy telephone number forwards the call so that the Landline Texting Engine intercepts the call to the restaurant's landline telephone number. The Landline Texting Engine generates the chat GUI 400 for display on the mobile device. The end-user of the mobile device may send a text message (Step 402) that describes a meal order 422. The Landline Texting Engine may parse the text message 422 and match the parsed portions of text (Step 412) to a menu GUI 408-1, 408-2 that lists the various menu items served at the restaurant and each menu item's respective prices. The Landline Texting Engine may calculate an invoice for menu items that match the parsed portions of the text message 422. The Landline Texting Engine may send a text message (Step 414) that states the cost of the order and generates a URL for the invoice and sends the URL as a text message for display in the chat GUI 400 (Step 416).

The end-user of the mobile device may select (i.e. tap) the invoice URL (Step 404) displayed in the chat GUI 400 and the Landline Texting Engine triggers display of a payment GUI 406 at the mobile device. The end-user of the mobile device may submit payment information via the payment GUI 406 and the computer device associated with the select landline telephone number receives the payment information and executes a purchase transaction according to the invoice. The Landline Texting Engine generates a receipt and a URL for the receipt and sends the receipt URL in a text message 424 to the mobile device (Step 418). The Landline Texting Engine may generate an order ticket for preparation of the meal order by the restaurant (Step 420).

According to various embodiments, a machine learning model(s) may be trained by the Landline Texting Engine and implemented for the restaurant (or any business or end-user) to predict the content of responsive text messages that should be sent via the proxy telephone number. The machine learning model(s) may be artificial intelligence modules to run one or more machine learning networks with respect to any type of data sent between a calling device and the proxy telephone number and Landline Texting Engine.

According to various embodiments, a machine learning model(s) may be based on one or more features associated with, for example, text message length, time of message receipt, type of calling device, one or more keywords in a text message, volume of incoming voice data, a number of unique calling devices sending incoming data during a defined time range and previously received data (voice/text) from a particular calling device. The Landline Texting Engine may intercept incoming voice data (or an incoming call) from a particular calling device sent to a business. The Landline Texting Engine may further collect one or more text messages sent from the calling device (i.e. previously received text messages, currently received text messages). The Landline Texting Engine may map attributes of the incoming voice data and collected text messages to features of the machine learning model(s) implemented for the business in order to build input for the machine learning model(s). In response to the built input, the machine learning model(s) may generate predictive output recommending responsive text messages and/or actions for the business.

Figure 5:
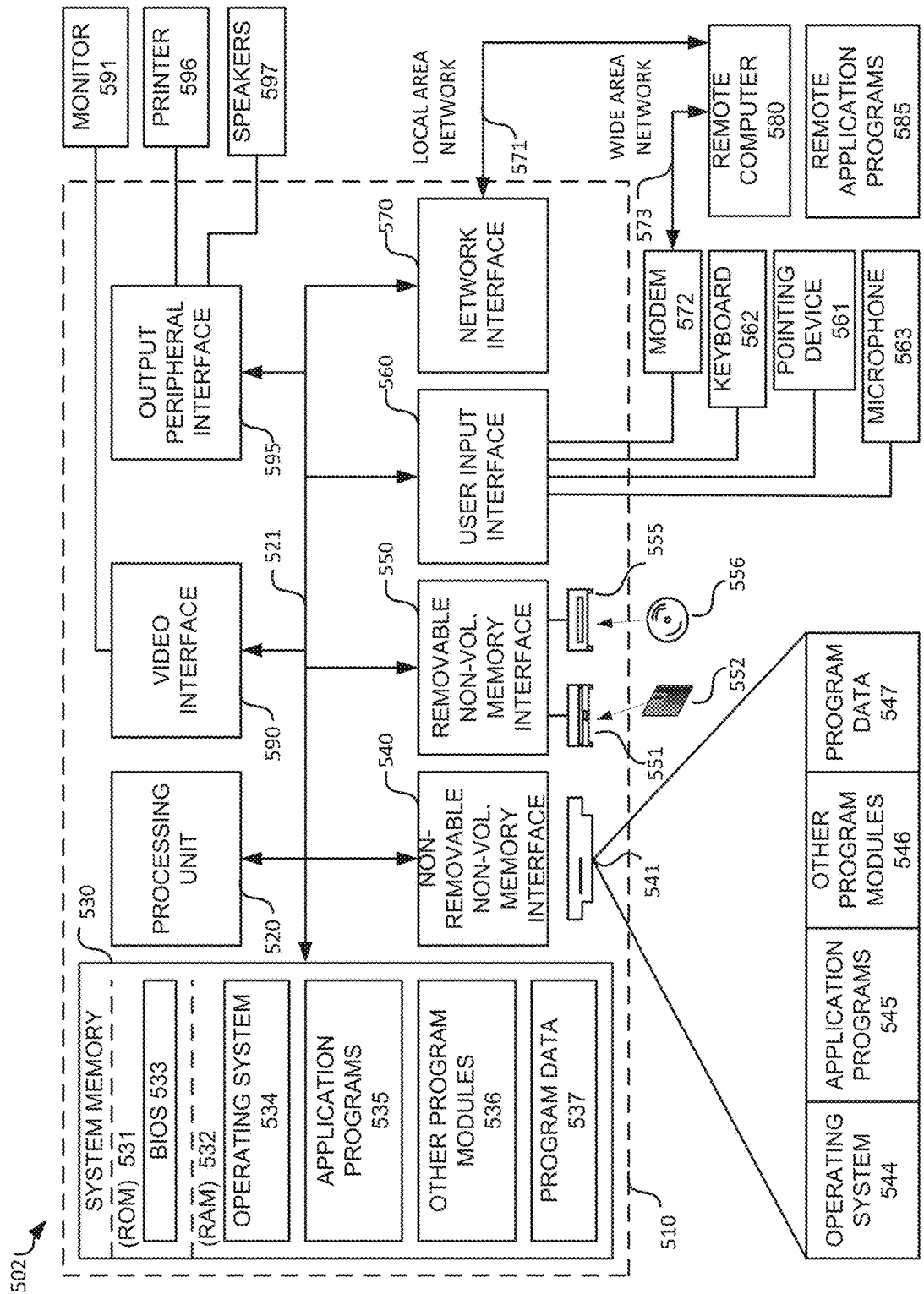
FIG. 5 shows a diagram of an example computing system that may be used with some embodiments.

The one or more machine learning networks include, but are not limited to, a neural net based algorithm, such as Artificial Neural Network, Deep Learning; a robust linear regression algorithm, such as Random Sample Consensus, Huber Regression, or Theil-Sen Estimator; a tree-based algorithm, such as Classification and Regression Tree, Random Forest, Extra Tree, Gradient Boost Machine, and/or Alternating Model System Overview Referring to FIG. 5, the computing system 502 may include, but are not limited to, a processing unit 520 having one or more processing cores, a system memory 530, and a system bus 521 that couples various system components including the system memory 530 to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 502 typically includes a variety of computer program product. Computer program product can be any available media that can be accessed by computing system 502 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 502. Communication media typically embodies computer readable instructions, data structures, or program modules.

The system memory 530 may include computer storage media in the form of volatile and/or nonvolatile memory such as read only memory (ROM) 531 and random-access memory (RAM) 532. A basic input/output system (BIOS) 533, containing the basic routines that help to transfer information between elements within computing system 502, such as during start-up, is typically stored in ROM 531. RAM 532 typically contains data and/or program modules that are immediately accessible to and/or presently being operated on by processing unit 520. By way of example, and not limitation, FIG. 5 also illustrates operating system 534, application programs 535, other program modules 536, and program data 537.

The computing system 502 may also include other removable/non-removable volatile/nonvolatile computer storage media. By way of example only, FIG. 5 also illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computing system 502. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. The operating system 544, the application programs 545, the other program modules 546, and the program data 547 are given different numeric identification here to illustrate that, at a minimum, they are different copies.

A user may enter commands and information into the computing system 502 through input devices such as a keyboard 562, a microphone 563, and a pointing device 561, such as a mouse, trackball or touch pad or touch screen. Other input devices (not shown) may include a joystick, game pad, scanner, or the like. These and other input devices are often connected to the processing unit 520 through a user input interface 560 that is coupled with the system bus 521, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 590.

The computing system 502 may operate in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computing system 502. The logical connections depicted in FIG. 5 includes a local area network (LAN) 571 and a wide area network (WAN) 573, but may also include other networks. Such networking environments are commonplace in offices, enterprise-wide computer networks, intranets and the Internet.

When used in a LAN networking environment, the computing system 502 may be connected to the LAN 571 through a network interface or adapter 570. When used in a WAN networking environment, the computing system 502 typically includes a modem 572 or other means for establishing communications over the WAN 573, such as the Internet. The modem 572, which may be internal or external, may be connected to the system bus 521 via the user-input interface 560, or other appropriate mechanism. In a networked environment, program modules depicted relative to the computing system 502, or portions thereof, may be stored in a remote memory storage device. By way of example, and not limitation, FIG. 5 illustrates remote application programs 585 as residing on remote computer 580. It will be appreciated that the network connections shown are exemplary and other means of establishing a communications link between the computers may be used.

It should be noted that some embodiments described herein may be carried out on a computing system such as that described with respect to FIG. 5. However, some embodiments may be carried out on a server, a computer devoted to message handling, handheld devices, or on a distributed system in which different portions of the present design may be carried out on different parts of the distributed computing system.

Another device that may be coupled with the system bus 521 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 572 may employ a Wireless Application Protocol (WAP) to establish a wireless communication channel. The communication module 572 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 6:
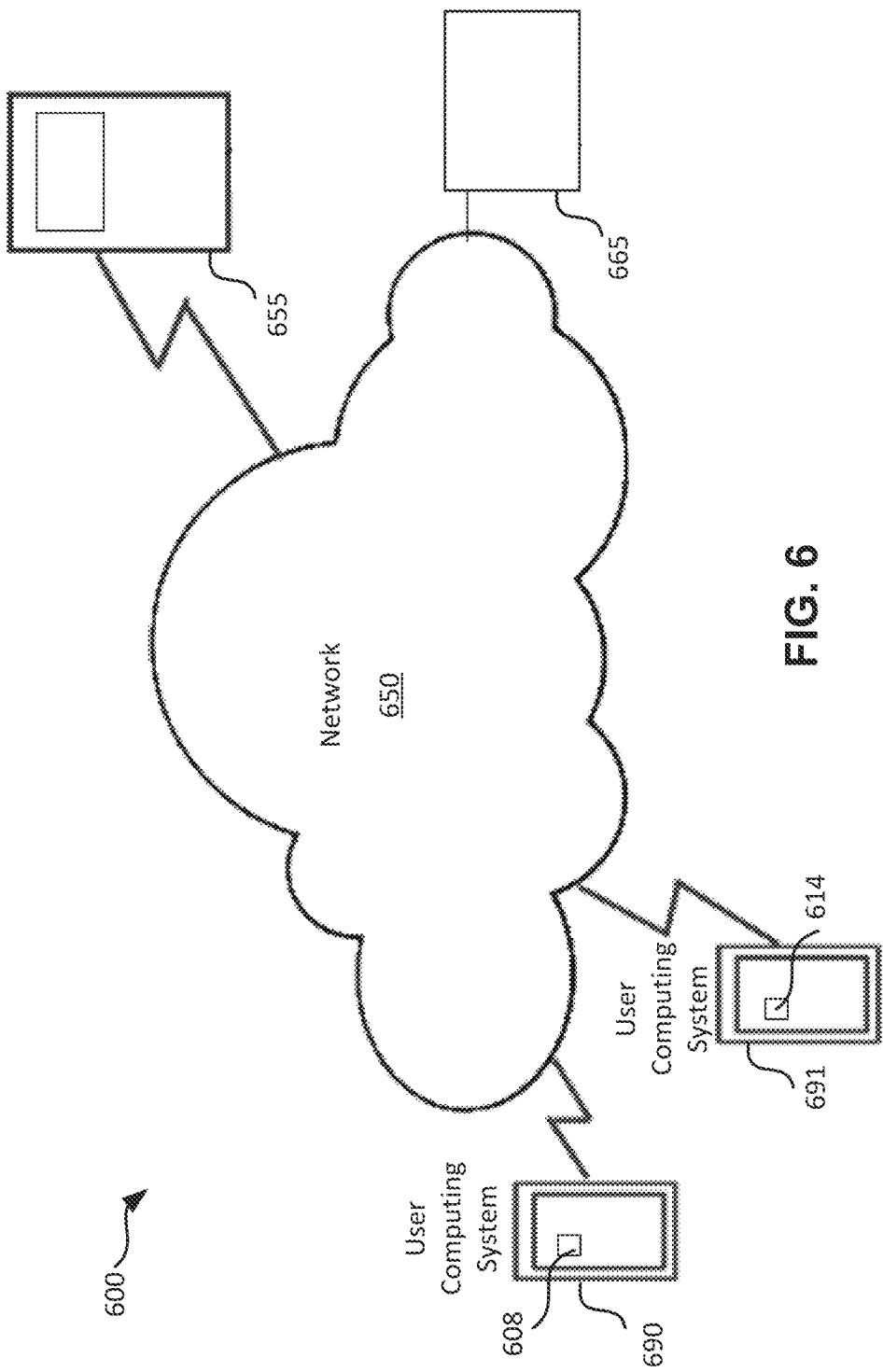
FIG. 6 shows a diagram of an example network environment that may be used with some embodiments.

FIG. 6 shows a diagram of an example network environment that may be used with some of the described embodiments. Network environment 620 includes computing systems 690 and 691. One or more of the computing systems 690 and 691 may be a mobile computing system that may include the decentralized certificate module. The computing systems 690 and 691 may be connected to the network 650 via a cellular connection or via a Wi-Fi router (not shown). The network 650 may be the Internet. The computing systems 690 and 691 may be coupled with server computing systems 655 and 665 via the network 650. The server computing systems 655 and 665 may also include the decentralized certificate module.

Each of the computing systems 690 and 691 may include an application module such as module 608 or 614. For example, a user (e.g., a developer) may use the computing system 690 and the application module 608 to connect to and communicate with the server computing system 655 and log into application 657.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer-implemented method comprising:
    associating a proxy telephone number with a select landline telephone number for forwarding incoming calls intended for the select landline telephone number to the proxy telephone number, the forwarding incoming calls comprising diverting the incoming call from the select landline telephone number to the proxy telephone number;
    intercepting a forwarded incoming call;
    detecting incoming voice data in the forwarded incoming call as being sent from a mobile phone number; and
    sending outgoing voice data on behalf of the select landline telephone number to a user of the mobile phone number in response to detecting the incoming voice data, the voice data including an option to opt-out of receiving text data;
    detecting an opt-out selection of the user of the mobile phone;
    sending text data on behalf of the select landline telephone number in response to detecting the user has not opted-out, the text data being modified such that the text data is identified as being sent from the select landline telephone number instead of the proxy telephone number; and
    terminating a connection between the proxy telephone number and the diverted incoming call in response to detecting the user has opted-out.

2. The computer-implemented method of claim 1, wherein associating a proxy telephone number with a select landline telephone number comprises:
    listing the proxy telephone number as a call forwarding destination for respecting incoming calls.

3. The computer-implemented method of claim 1, wherein intercepting a forwarded incoming call comprises:
    intercepting the incoming voice data forwarded to the proxy number.

4. The computer-implemented method of claim 1, wherein sending text data on behalf of the select landline telephone number comprises:
    sending outgoing voice data via voice data capabilities of a respective phone line for the select landline telephone number; and
    sending the text data to the mobile telephone number via text data capabilities of the respective phone line for the select landline telephone number.

5. The computer-implemented method of claim 1, further comprises:
    receiving voicemail data from the mobile phone number in response to the outgoing voice data; and
    storing the voicemail data on behalf of the select landline telephone number prior to terminating communication.

6. The computer-implemented method of claim 1, further comprising
    detecting the incoming voice data as being sent from a calling landline phone number;
    triggering display of a message on a graphical user interface associated with the select landline phone number; and
    providing the select landline phone number with access to the incoming voice data from the calling landline phone number.

7. A computer program product comprising computer-readable program code to be executed by one or more processors when retrieved from a non-transitory computer-readable medium, the program code including at least one instruction to:
    associate a proxy telephone number with a select landline telephone number for forwarding incoming calls intended for the select landline telephone number to the proxy telephone number, the forwarding incoming calls comprising diverting the incoming call from the select landline telephone number to the proxy telephone number;

intercept a forwarded incoming call;

detect incoming voice data in the forwarded incoming call as being sent from a mobile phone number;

send outgoing voice data on behalf of the select landline telephone number to a user of the mobile phone number in response to detecting the incoming voice data, the voice data including an option to opt-out of receiving text data;

detect an opt-out selection of the user of the mobile phone;

send text data on behalf of the select landline telephone number in response to detecting the user has not opted-out, the text data being modified such that the text data is identified as being sent from the select landline telephone number instead of the proxy telephone number; and terminate a connection between the proxy telephone number and the diverted incoming call in response to detecting the user has opted-out.

8. The computer program product of claim 7, wherein associate a proxy telephone number with a select landline telephone number comprises:

list the proxy telephone number as a call forwarding destination for respecting incoming calls.

9. The computer program product of claim 7, wherein intercept a forwarded incoming call comprises:

intercept the incoming voice data forwarded to the proxy number.

10. The computer program product of claim 7, wherein send text data on behalf of the select landline telephone number from the proxy telephone number comprises:

send outgoing voice data via voice data capabilities of a respective phone line for the select landline telephone number; and send the text data to the mobile telephone number via text data capabilities of the respective phone line for the select landline telephone number.

11. The computer program product of claim 7, further comprises:

receive voicemail data from the mobile phone number in response to the outgoing voice data; and store the voicemail data on behalf of the select landline telephone number prior to terminating communication.

12. The computer program product of claim 7, further comprising detect the incoming voice data as being sent from a calling landline phone number;

trigger display of a message on a graphical user interface associated with the select landline phone number; and provide the select landline phone number with access to the incoming voice data from the calling landline phone number.

13. A system comprising:

one or more processors; and a non-transitory computer readable medium storing a plurality of instructions, which when executed, cause the one or more processors to:

associate a proxy telephone number with a select landline telephone number for forwarding incoming calls intended for the select landline telephone number to the proxy telephone number, the forwarding incoming calls comprising diverting the incoming call from the select landline telephone number to the proxy telephone number;

intercept a forwarded incoming call;

detect incoming voice data in the forwarded incoming call as being sent from a mobile phone number;

send outgoing voice data on behalf of the select landline telephone number to a user of the mobile phone number in response to detecting the incoming voice data, the voice data including an option to opt-out of receiving text data;

detect an opt-out selection of the user of the mobile phone;

send text data on behalf of the select landline telephone number in response to detecting the user has not opted-out, the text data being modified such that the text data is identified as being sent from the select landline telephone number instead of the proxy telephone number; and terminate a connection between the proxy telephone number and the diverted incoming call in response to detecting the user has opted-out.

14. The system of claim 13, wherein associate a proxy telephone number with a select landline telephone number comprises:

list the proxy telephone number as a call forwarding destination for respecting incoming calls.

15. The system of claim 13, wherein intercept a forwarded incoming call comprises:

intercept the incoming voice data forwarded to the proxy number;

wherein detect incoming voice data comprises:

detect the incoming voice data as being sent from a mobile phone number; and wherein send text data on behalf of the select landline telephone number from the proxy telephone number comprises:

send outgoing voice data via voice data capabilities of a respective phone line for the select landline telephone number; and send the text data to the mobile telephone number via text data capabilities of the respective phone line for the select landline telephone number.

\* \* \* \* \*